(12) United States Patent
Hagihara et al.

(10) Patent No.: US 12,451,290 B2
(45) Date of Patent: Oct. 21, 2025

(54) CAPACITOR (71) Applicant: Panasonic Intellectual Property Management Co., Ltd., Osaka (JP)

(72) Inventors: Yosuke Hagihara, Osaka (JP); Kazushi Yoshida, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 164 days.

(21) Appl. No.: 18/555,475

(22) PCT Filed: Mar. 22, 2022

(86) PCT No.: PCT/JP2022/013168
§ 371 (c)(1),
(2) Date: Oct. 13, 2023

(87) PCT Pub. No.: WO2022/224669
PCT Pub. Date: Oct. 27, 2022

(65) Prior Publication Data
US 2024/0203654 A1 Jun. 20, 2024

(30) Foreign Application Priority Data
Apr. 21, 2021 (JP) .................. 2021-072069

(51) Int. Cl.
*H01G 4/228* (2006.01)
*H01G 4/33* (2006.01)

(52) U.S. Cl.
CPC ............... *H01G 4/228* (2013.01); *H01G 4/33* (2013.01)

(58) Field of Classification Search
CPC ................................. H01G 4/228; H01G 4/33
(Continued)

(56) References Cited

U.S. PATENT DOCUMENTS 9,196,672 B2 * 11/2015 Tran ....................... H10D 1/665
2012/0199949 A1 * 8/2012 Lan .......................... H01G 4/10
438/386

(Continued)

FOREIGN PATENT DOCUMENTS

JP 2001-523050 A 11/2001
JP 2020-501363 A 1/2020
(Continued)

OTHER PUBLICATIONS

International Search Report dated Jun. 21, 2022 issued in International Patent Application No. PCT/JP2022/013168, with English translation.

*Primary Examiner* — Arun Ramaswamy
(74) *Attorney, Agent, or Firm* — Rimon P.C.

(57) ABSTRACT

A capacitor includes a silicon substrate, a first terminal, a dielectric layer, a conductive portion, and a second terminal. The silicon substrate has a principal surface and a porous part. The principal surface includes an opening region and a non-opening region other than the opening region. The porous part has an opening in the opening region. The first terminal is electrically connected to the silicon substrate. The dielectric layer is formed on an inner surface of the porous part. The conductive portion is filled, on the dielectric layer, in the porous part. The second terminal is electrically connected to the conductive portion. At least one of the first terminal or the second terminal overlaps at least part of the porous part in the normal direction of the principal surface.

6 Claims, 11 Drawing Sheets

(58) Field of Classification Search
USPC .................................... 361/301.1, 311, 303
See application file for complete search history.

(56) References Cited

U.S. PATENT DOCUMENTS

| | | |
|---|---|---|
| 2018/0158617 A1 | 6/2018 | Carver et al. |
| 2019/0341193 A1 | 11/2019 | Carver et al. |
| 2019/0341194 A1 | 11/2019 | Carver et al. |
| 2019/0341195 A1 | 11/2019 | Carver et al. |
| 2019/0341196 A1 | 11/2019 | Carver et al. |
| 2020/0219656 A1* | 7/2020 | Higuchi ................. H10D 1/043 |
| 2021/0407734 A1 | 12/2021 | Yoshida et al. |

FOREIGN PATENT DOCUMENTS

| | | |
|---|---|---|
| WO | 99/25026 A1 | 5/1999 |
| WO | 2018/102598 A1 | 6/2018 |
| WO | 2019/171470 A1 | 9/2019 |
| WO | 2020/184517 A1 | 9/2020 |

* cited by examiner

CAPACITOR

CROSS-REFERENCE OF RELATED APPLICATIONS

This application is the U.S. National Phase under 35 U.S.C. § 371 of International Patent Application No. PCT/JP2022/013168, filed on Mar. 22, 2022, which in turn claims the benefit of Japanese Patent Application No. 2021-072069, filed on Apr. 21, 2021, the entire disclosures of which Applications are incorporated by reference herein.

TECHNICAL FIELD

The present disclosure generally relates to capacitors and specifically relates to a capacitor including a silicon substrate.

BACKGROUND ART

Patent Literature 1 discloses a capacitor. The capacitor includes a silicon substrate, a conductor layer, and a dielectric layer. The silicon substrate has a principal surface including a capacitance generation region and a non-capacitance generation region, and the silicon substrate has a porous part provided in a thickness direction in the capacitance generation region. The conductor layer has a surface layer part at least covering part of a surface of the capacitance generation region and a filling part filled in at least part of fine pores of the porous part. The dielectric layer is provided between an inner surface of the fine pores and the filling part.

The capacitor of Patent Literature 1 is still susceptible to improvement in electrostatic capacitance.

CITATION LIST

Patent Literature

Patent Literature 1: WO 2020/184517 A1

SUMMARY OF INVENTION

It is an object of the present disclosure to provide a capacitor having increased electrostatic capacitance per substrate unit area.

A capacitor according to an aspect of the present disclosure includes a silicon substrate, a first terminal, a dielectric layer, a conductive portion, and a second terminal. The silicon substrate has a principal surface and a porous part. The principal surface includes an opening region and a non-opening region other than the opening region. The porous part has an opening in the opening region. The first terminal is electrically connected to the silicon substrate. The dielectric layer is on an inner surface of the porous part. The conductive portion is filled, on the dielectric layer, in the porous part. The second terminal is electrically connected to the conductive portion. At least one of the first terminal or the second terminal overlaps at least part of the porous part in a normal direction of the principal surface.

DESCRIPTION OF EMBODIMENTS

1. Overview

As described above, the capacitor of Patent Literature 1 is still susceptible to improvement in electrostatic capacitance. Therefore, the inventors intensively studied to increase electrostatic capacitance per substrate unit area and consequently developed a capacitor 1 as described below.

Figure 1:
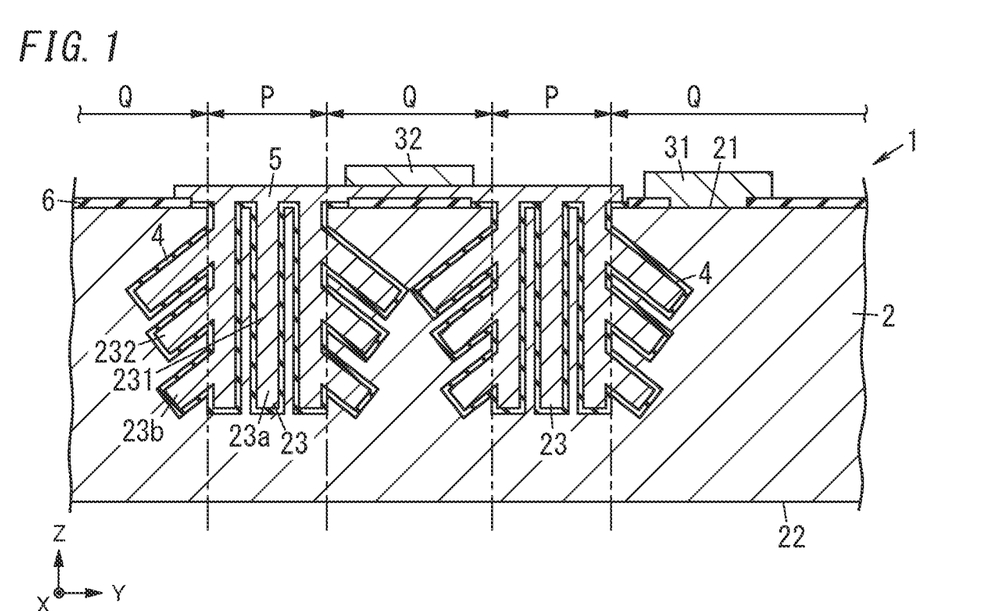
FIG. 1 is a schematic sectional view of a capacitor according to a first embodiment.

That is, the capacitor 1 according to the present embodiment includes a silicon substrate 2, a first terminal 31, a dielectric layer 4, a conductive portion 5, and a second terminal 32 (see FIG. 1).

At least one of the first terminal 31 or second terminal 32 overlaps at least part of a porous part 23 in a normal direction (Z-axis direction) of a principal surface 21.

As shown in FIG. 1, in the capacitor 1 according to the present embodiment, not only is the porous part 23 (a first porous part 231) formed in an opening region P, but also the porous part 23 (a second porous part 232) is formed in a non-opening region Q. In addition, the first terminals 31 and the second terminals 32 overlap the porous parts 23 in XY plan view, while the strength of the silicon substrate 2 in a thickness direction (Z-axis direction) is secured.

In the present embodiment, an electrode area can be increased by forming the porous part 23 in both the opening region P and the non-opening region Q as compared with the case of forming the porous part 23 in only the opening region P.

Thus, electrostatic capacitance per substrate unit area can be increased.

2. Details

(1) First Embodiment

(1.1) Capacitor

The capacitor 1 according to the present embodiment will be described below with reference to the drawings. Note that the drawings are schematic diagrams and are not necessarily exact illustrations. For the sake of description of a positional relationship and the like, arrows representing an X axis, a Y axis, and a Z axis constituting a three-dimensional orthogonal coordinate system are shown in the drawings, but these arrows are intangible. In the following description, "in XY plan view" means that on object is viewed along the Z-axis direction. The X-axis, Y-axis, and Z-axis directions are mere examples and do not intend to limit directions of the capacitor 1 in manufacturing and in use.

In FIG. 1, the capacitor 1 according to the present embodiment is shown. The capacitor 1 includes the silicon substrate 2, at least one or more (in the present embodiment, a plurality of) first terminals 31, the dielectric layer 4, the conductive portion 5, and at least one or more (in the present embodiment, a plurality of) second terminals 32. Thus, the capacitor 1 according to the present embodiment is a silicon capacitor.

<Silicon Substrate>

The silicon substrate 2 can constitute one electrode (first electrode) of the capacitor 1. The silicon substrate 2 may be a p-type semiconductor or may be an n-type semiconductor. The p-type semiconductor is formed by adding a small amount of a trivalent element (boron, aluminum, gallium, indium, etc.) to an intrinsic semiconductor made of a tetravalent element (silicon). The n-type semiconductor is formed by adding a small amount of a pentavalent element (phosphorus, arsenic, antimony, etc.) to an intrinsic semiconductor made of a tetravalent element (silicon).

In the present embodiment, the silicon substrate 2 has a plate shape extending in the X-axis direction and the Y-axis direction. The shape of the silicon substrate 2 in XY plan view is, for example, but not particularly limited to, a rectangular shape. The thickness (the length in the Z-axis direction) of the silicon substrate 2 is not particularly limited but is, for example, greater than or equal to 300 μm and less than or equal to 1000 μm.

The silicon substrate 2 has the first surface 21 (hereinafter also referred to as a "principal surface 21") and a second surface 22. The first surface 21 is a surface directed in the positive direction of the Z axis. The second surface 22 is a surface on an opposite side from the first surface 21. That is, the second surface 22 is a surface directed in the negative direction of the Z axis. In the present embodiment, the first surface 21 and the second surface 22 are, for example, but not particularly limited to, flat surfaces.

The principal surface 21 includes at least one opening region P and at least one non-opening region Q. The opening region P is a region densely provided with a plurality of openings. The shape of the opening region P in the XY plan view is, for example, but not particularly limited to, a rectangular shape. The non-opening region Q is a region other than the opening region P.

The silicon substrate 2 includes the porous part 23. The porous part 23 is in the silicon substrate 2. The porous part 23 has an opening in the opening region P (see, for example, FIG. 4B).

The porous part 23 includes the first porous part 231 and the second porous part 232.

The first porous part 231 is in the opening region P in XY plan view. The first porous part 231 includes a plurality of first fine pores 23a. Each first fine pore 23a is a non-through hole extending from the first surface 21 of the silicon substrate 2 toward the second surface 22. Each first fine pore 23a has an opening in the principal surface 21 of the silicon substrate 2. The plurality of first fine pores 23a are substantially parallel to the thickness direction (Z-axis direction) defined with respect to the silicon substrate 2. The inner diameter of each first fine pore 23a is not particularly limited but is, for example, greater than or equal to 0.5 μm and less than or equal to 5 μm.

The second porous part 232 is in the non-opening region Q in XY plan view. The second porous part 232 is around the first porous part 231 in XY plan view. The second porous part 232 is communicated with the first porous part 231. The second porous part 232 includes a plurality of second fine pores 23b. Each second fine pore 23b is a non-through hole branched off from a corresponding one of the first fine pores 23a located on an outer side of the first porous part 231 in XY plan view. Each second fine pore 23b is tilted with respect to the corresponding one of the first fine pores 23a. Specifically, each second fine pore 23b extends from the first surface 21 of the silicon substrate 2 toward the second surface 22 to be away from the corresponding one of the first fine pores 23a. The inner diameter of the second fine pore 23b is not particularly limited but is, for example, greater than or equal to 0.5 μm and less than or equal to 5 μm.

As shown in FIG. 1, in XY plan view, the first porous part 231 is all over the opening region P, and the second porous part 232 is in at least part of the non-opening region Q.

The inner structure of the porous part 23 is not particularly limited as long as it is a continuous air bubble and has an open in the opening region P of the principal surface 21. For example, the first fine pores 23a may be communicated with each other.

<First Terminal>

Each first terminal 31 is a conductive member. For example, each first terminal 31 is made of a metal material. Each first terminal 31 is electrically connected to the silicon substrate 2. Specifically, each first terminal 31 is directly connected to the principal surface 21 of the silicon substrate 2. Each first terminal 31 is in ohmic contact with the silicon substrate 2. The shape of each first terminal 31 in XY plan view is, for example, but not particularly limited to, a rectangular shape (see FIG. 9).

<Dielectric Layer>

The dielectric layer 4 is an electrically insulating layer. The dielectric layer 4 is a layer lying between the first electrode (mainly, the silicon substrate 2) and the second electrode (mainly, the conductive portion 5) of the capacitor 1. The dielectric layer 4 is formed on an inner surface of the porous part 23. Specifically, the dielectric layer 4 is formed on inner surfaces of the first fine pores 23a of the first porous part 231 and inner surfaces of the second fine pores 23b of the second porous part 232.

Further, the dielectric layer 4 is formed on an insulating layer 6 on the principal surface 21 of the silicon substrate 2. The thickness of the dielectric layer 4 is not particularly limited but is, for example, greater than or equal to several nm and less than or equal to 500 nm.

A material for the dielectric layer 4 is not particularly limited, but examples of the material include silicon oxide, titanium oxide, zirconium oxide, hafnium oxide, vanadium oxide, tungsten oxide, niobium oxide, tantalum oxide, and aluminum oxide. For example, the inner surface of the porous part 23 is oxidized to form the dielectric layer 4 including silicon oxide.

The dielectric layer 4 may be a single layer or may include a plurality of layers. Examples of the plurality of layers are not particularly limited but are, for example, an Oxide/Nitride/Oxide layer (ONO layer). The ONO layer include a first silicon oxide layer, a silicon nitride layer, and a second silicon oxide layer. The first silicon oxide layer, the silicon nitride layer, and the second silicon oxide layer are stacked in this order, thereby forming the ONO layer.

<Conductive Portion>

The conductive portion 5 is a portion which is electrically conductive. The conductive portion 5 is filled, on the dielectric layer 4, in the porous part 23. Thus, the conductive portion 5 can constitute the other electrode (second electrode) to be paired with the silicon substrate 2 which can constitute the one electrode (the first electrode) in the capacitor 1. A material for the conductive portion 5 is not particularly limited, but examples of the material include polysilicon (polycrystalline silicon), platinum, and ruthenium.

Figure 8:
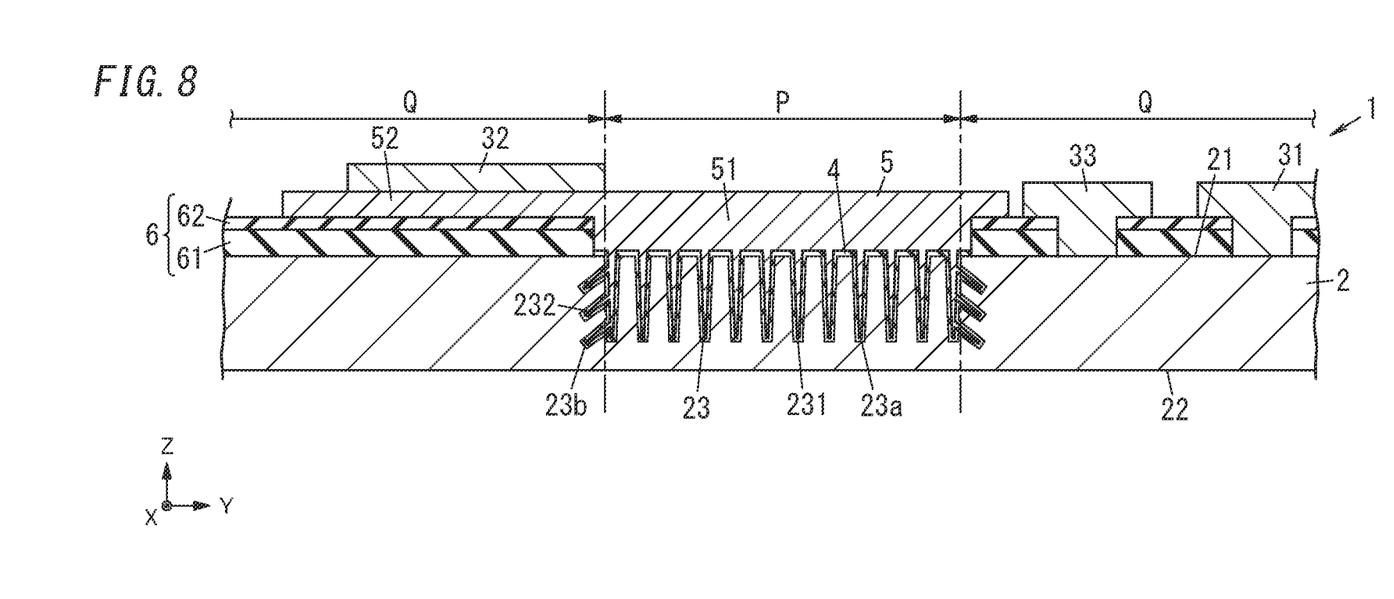
FIG. 8 is a schematic sectional view of the capacitor.

Here, the conductive portion 5 includes a first conductive portion 51 and a second conductive portion 52 (see FIG. 8). The first conductive portion 51 and the second conductive portion 52 are integrated with each other as one piece.

The first conductive portion 51 is in the negative direction of the Z axis with respect to a boundary surface (corresponding to the dotted line in FIG. 6B), where a plane including a surface (a surface directed in the positive direction of the Z axis) of the insulating layer 6 is assumed to be the boundary surface. The first conductive portion 51 is in contact with the dielectric layer 4. In the present embodiment, the first conductive portion 51 is filled, on the dielectric layer 4, in the porous part 23. Specifically, the first conductive portion 51 is filled, on the dielectric layer 4, in the first fine pores 23a of the first porous part 231 and in the second fine pores 23b of the second porous part 232. The first conductive portion 51 is out of contact with the silicon substrate 2.

The second conductive portion 52 is in the positive direction of the Z axis with respect to the boundary surface. The second conductive portion 52 is in contact with the insulating layer 6. The second conductive portion 52 is also out of contact with the silicon substrate 2.

<Second Terminal>

The second terminals 32 are conductive members in a similar manner to the first terminals 31. For example, each second terminal 32 is also made of a metal material.

Each second terminal 32 is electrically connected to the conductive portion 5. Specifically, each second terminal 32 is disposed on a surface (surface directed in the positive direction of the Z axis) of the second conductive portion 52 (see FIG. 8). Each second terminal 32 is in ohmic contact with the conductive portion 5. The shape of each second terminal 32 in XY plan view is, for example, but not particularly limited to, a rectangular shape (see FIG. 9).

<Positional Relationship Between First Terminal and Second Terminal>

In the present embodiment, the first terminals 31 and the second terminals 32 are in the non-opening region Q. the silicon substrate 2 has a portion which is in the non-opening region Q and which is provided with no porous part 23 (second porous part 232). Therefore, even when a force in the Z-axis direction is applied to the first terminals 31 and the second terminals 32, the silicon substrate 2 is less likely to be damaged.

Figure 9:
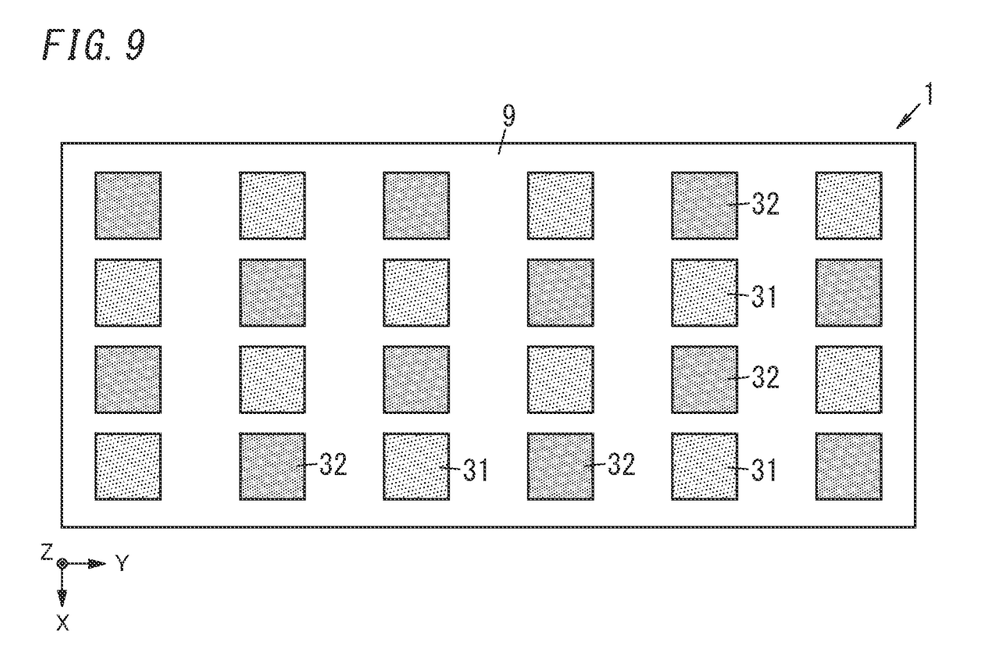
FIG. 9 is a schematic plan view of the capacitor.

Moreover, in the present embodiment, as shown in FIG. 9, the plurality of first terminals 31 and the plurality of second terminals 32 are arranged in a lattice pattern when viewed in the normal direction (Z-axis direction) of the principal surface 21. In FIG. 9, in order to visually distinguish the first terminals 31 from the second terminals 32, they are shaded with dots in different densities. The plurality of first terminals 31 and the plurality of second terminals 32 are aligned along the X-axis direction and the Y-axis direction. Thus, Equivalent Series Resistance (ESR) and Equivalent Series Inductance (ESL) can be reduced. Note that the lattice pattern is not particularly limited, but examples of the lattice pattern includes a tetragonal lattice pattern and a rhombic lattice pattern.

In FIG. 9, a resist layer 9 is shown. The resist layer 9 is an electrically insulating layer. Except for portions where the plurality of first terminals 31 and the plurality of second terminals 32 are disposed, the resist layer 9 covers a surface, at the side of the principal surface 21 of the silicon substrate 2, of the capacitor 1.

Further, in the present embodiment, as shown in FIG. 9, the plurality of first terminals 31 and the plurality of second terminals 32 are alternately aligned when viewed in the normal direction (Z-axis direction) of the principal surface 21. That is, the plurality of first terminals 31 and the plurality of second terminals 32 are alternately aligned along the X-axis direction and the Y-axis direction. As explained above, the plurality of first terminals 31 and the plurality of second terminals 32 are not unevenly distributed. Thus, the ESR and the ESL can be further reduced.

<Positional Relationship Among First Terminal, Second Terminal, and Porous Part>

In the normal direction (Z-axis direction) of the principal surface 21, at least one of the first terminals 31 or the second terminals 32 overlaps at least part of the porous part 23. In the present embodiment, as shown in FIG. 1, the first terminals 31 and the second terminals 32 overlap the second porous part 232.

<Effects>

In the capacitor 1 according to the present embodiment, not only is the porous part 23 (the first porous part 231) formed in the opening region P, but also the porous part 23 (the second porous part 232) is formed in the non-opening region Q. In addition, the first terminals 31 and the second terminals 32 overlap the porous part 23 in XY plan view, while the strength of the silicon substrate 2 in the thickness direction (Z-axis direction) is secured.

In the present embodiment, an electrode area can be increased by forming the porous part 23 in both the opening region P and the non-opening region Q as compared with the case of forming the porous part 23 in only the opening region P. Note that the "electrode area" means an area in which the silicon substrate 2 as the first electrode and the conductive portion 5 as the second electrode face each other via the dielectric layer 4 therebetween.

Thus, electrostatic capacitance per substrate unit area can be increased. Note that the "substrate unit area" means a unit area of the silicon substrate 2 in XY plan view.

<Applications>

Next, applications of the capacitor 1 according to the present embodiment will be described with reference to the drawings. Note that the applications of the capacitor 1 is not limited to the following applications.

Figure 2:
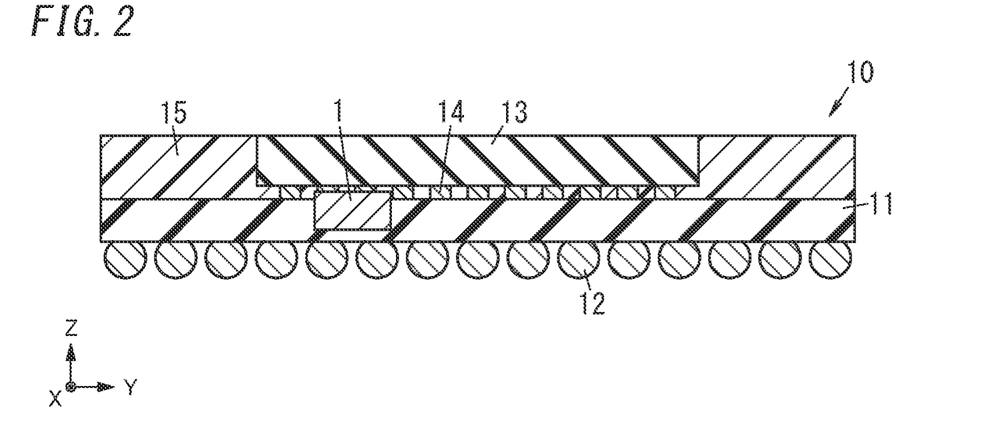
FIG. 2 is a schematic sectional view of an electronic component including the capacitor.

The capacitor 1 is usable as a component of an electronic component 10. In FIG. 2, the electronic component 10 is shown. The electronic component 10 includes the capacitor 1, an insulating substrate 11, an IC chip 13, and a sealing portion 15.

The insulating substrate 11 includes the capacitor 1 therein. The capacitor 1 has a surface directed in the positive direction of the Z axis and exposed from the insulating substrate 11. Although not shown, the plurality of first terminals 31 and the plurality of second terminals 32 are on the surface of the capacitor 1 directed in the positive direction of the Z axis. The insulating substrate 11 includes a plurality of bumps 12. The plurality of bumps 12 are provided on a surface of the insulating substrate 11 directed to the negative direction of the Z axis. The plurality of bumps 12 electrically connect the electronic component 10 to another electronic component (not shown).

The IC chip 13 is mounted on a surface of the insulating substrate 11 directed in the positive direction of the Z axis. The IC chip 13 includes a plurality of terminals 14. The plurality of terminals 14 are disposed on a surface of the IC chip 13 directed in the negative direction of the Z axis. Thus, the IC chip 13 is a chip having a multiterminal geometry. The capacitor 1 according to the present embodiment includes the plurality of first terminals 31 and the plurality of second terminals 32 and can thus be electrically connectable even to a chip having the multiterminal geometry. Note that some of the plurality of terminals 14 may be electrically connected to the capacitor 1 and the remaining terminals of the plurality of terminals 14 may be electrically connected to a circuit (not shown) on the insulating substrate 11.

The sealing portion 15 seals a bonding part between the capacitor 1 and the IC chip 13, a bonding part between the IC chip 13 and a circuit on the insulating substrate 11, and the other circuits (not shown) on the insulating substrate 11.

(1.2) Method of Manufacturing Capacitor

Next, a method of manufacturing the capacitor 1 according to the present embodiment will be described with reference to the drawings. The method of manufacturing the capacitor 1 includes a masking layer forming step, a porous part forming step, a dielectric layer forming step, a conductive portion forming step, and a terminal forming step.

<Masking Layer Forming Step>

Figure 3A:
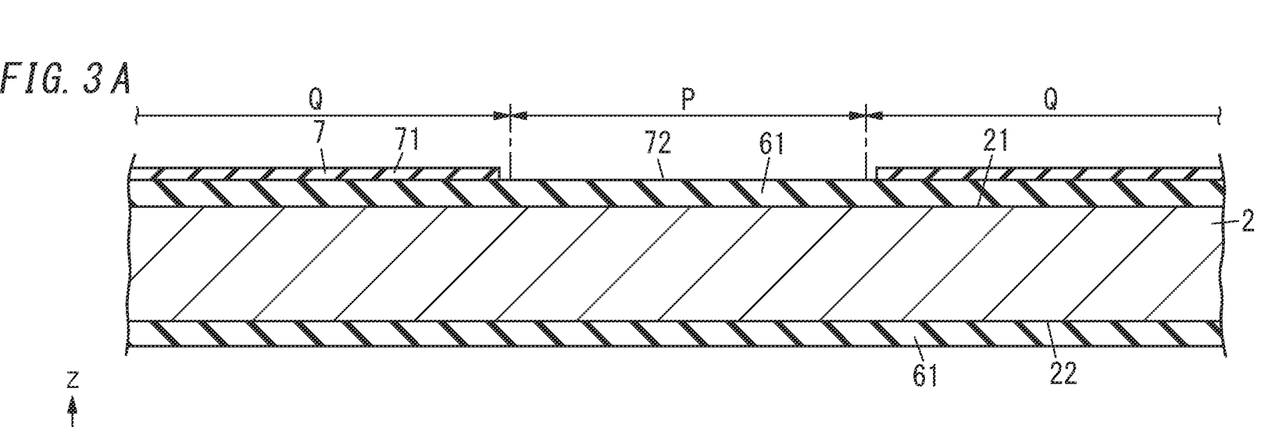
FIGS. 3A and 3B are schematic sectional views illustrating steps in a method of manufacturing the capacitor according to the first embodiment.
Figure 3B:
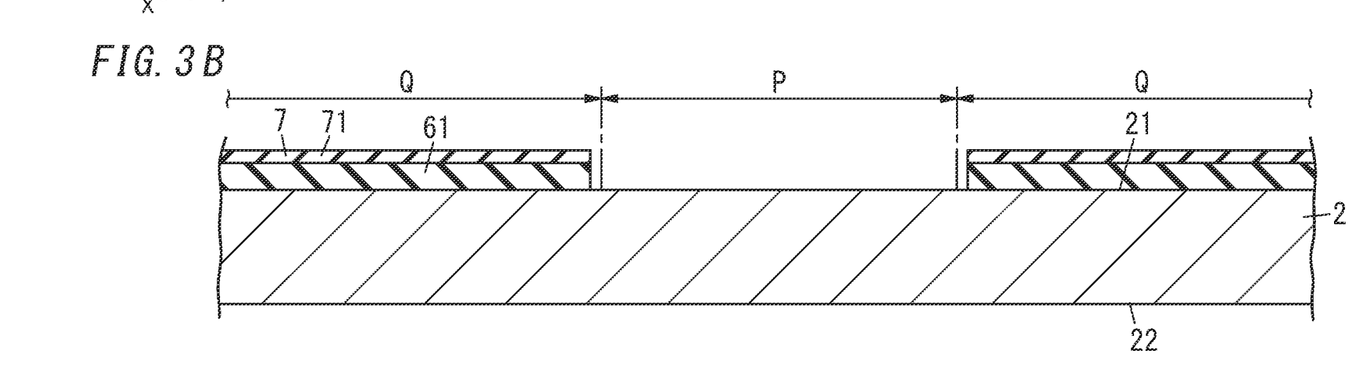

As shown in FIG. 3A, the masking layer forming step includes first of all forming a first insulating layer 61 on the first surface 21 and the second surface 22 of the silicon substrate 2. The first insulating layer 61 can be formed by, for example, a thermal oxidation process. The thermal oxidation process can be performed by heating the silicon substrate 2 at a temperature of higher than or equal to 1000° C. and lower than or equal to 1200° ° C. in an oxygen atmosphere. Thus, the first insulating layer 61 becomes a layer including silicon oxide.

Then, a masking layer 7 is formed on the first insulating layer 61 on the first surface 21 of the silicon substrate 2. That is, the masking layer 7 is formed on a surface (surface directed in the positive direction of the Z axis) of the first insulating layer 61. The masking layer 7 can be formed by, for example, a chemical vapor deposition (CVD) method. The chemical vapor deposition method is not particularly limited, but examples of the chemical vapor deposition method include thermal CVD and plasma CVD. A material for the masking layer 7 is not particularly limited, but examples of the material include silicon nitride. In the present embodiment, the masking layer 7 is a layer including silicon nitride.

As shown in FIG. 3A, the masking layer 7 includes a non-opening section 71 and an opening section 72. The non-opening section 71 covers the first insulating layer 61 in the non-opening region Q. The first insulating layer 61 in the opening region P is exposed outside through the opening section 72. Note that the first insulating layer 61 formed on the second surface 22 is exposed outside.

Then, partial etching is performed. This removes the first insulating layer 61 in the opening region P and the first insulating layer 61 formed on the second surface 22. On the other hand, the first insulating layer 61 in the non-opening region Q is covered with the masking layer 7 (non-opening section 71) and is thus not removed. The partial etching is not particularly limited, but examples of the partial etching include dry etching. Among the dry etching, plasma etching is preferable. Note that the non-opening section 71 eventually becomes a second insulating layer 62 (see FIG. 8).

<Porous Part Forming Step>

Figure 4A:
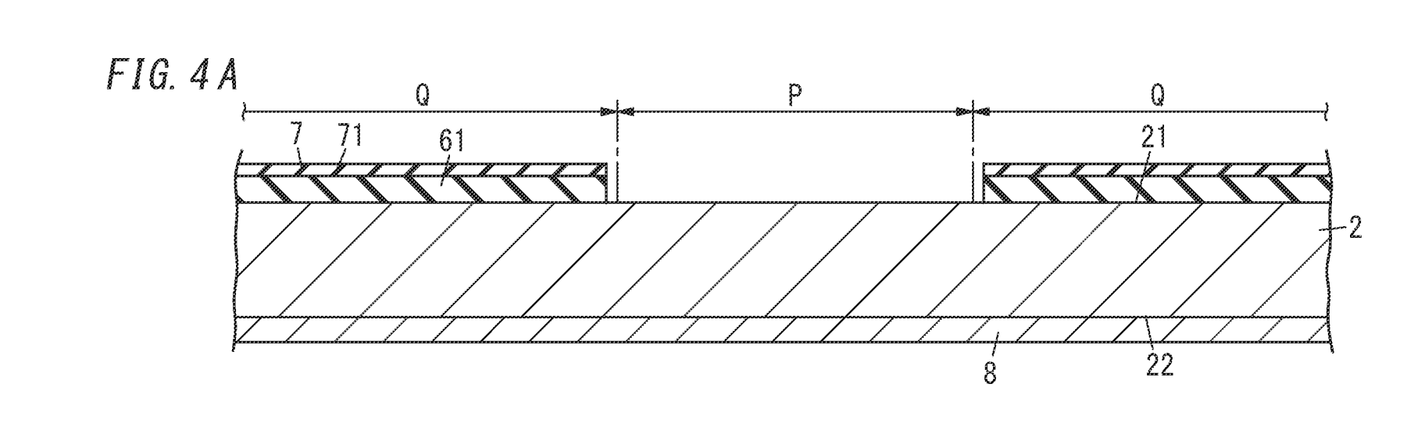
FIGS. 4A and 4B are schematic sectional views illustrating steps in the method of manufacturing the capacitor.
Figure 4B:
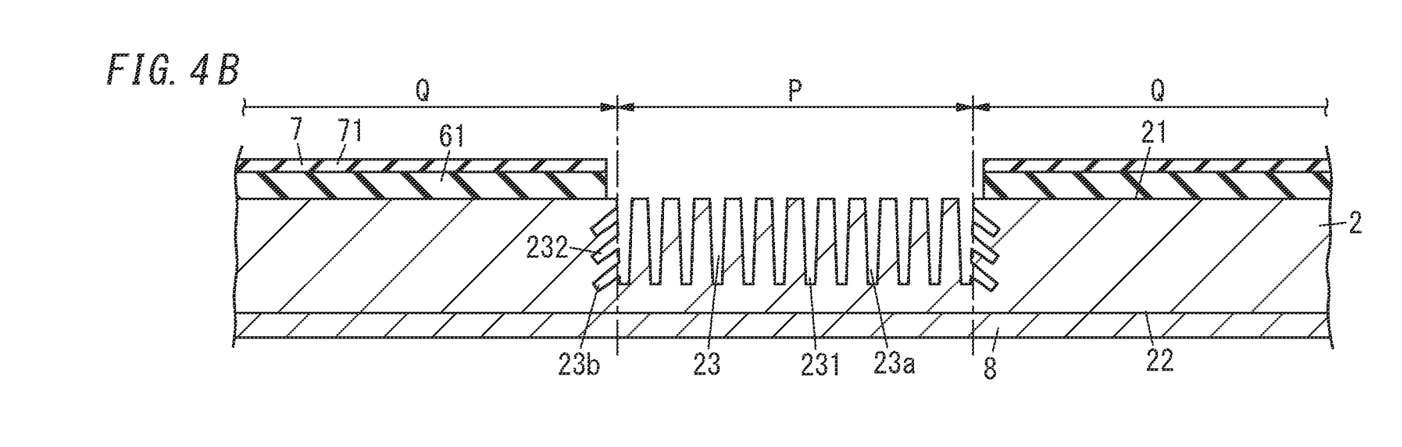

As shown in FIG. 4A, the porous part forming step includes first of all forming an electrode 8 on the second surface 22 of the silicon substrate 2. The electrode 8 can be formed by, for example, a physical vapor deposition (PVD) method. The electrode 8 is electrically connected to the silicon substrate 2. The electrode 8 is in ohmic contact with the silicon substrate 2.

Then, the silicon substrate 2 is subjected to an anode oxidation process. The anode oxidation process can be performed by immersing the silicon substrate 2 and a platinum electrode (not shown) in an electrolytic solution and energizing the electrode 8 of the silicon substrate 2 as the anode and the platinum electrode as the cathode. Thus, the porous part 23 is formed in the silicon substrate 2. The first porous part 231 is formed in the opening region P. The second porous part 232 is formed in the non-opening region Q.

Here, the electrolytic solution is not particularly limited, but examples of the electrolytic solution include hydrofluoric acid. The hydrofluoric acid may further include ethanol. This efficiently removes hydrogen produced by the anode oxidation, thereby forming the porous part 23 having a more uniform structure. The depth and the inner diameter of each of the first fine pores 23a and the second fine pores 23b can be adjusted depending on conditions for the anode oxidation process. The conditions for the anode oxidation process are not particularly limited, but examples of the conditions include a specific resistance (electrical resistivity) of the silicon substrate 2, the composition of the electrolytic solution, and current density.

Figure 5A:
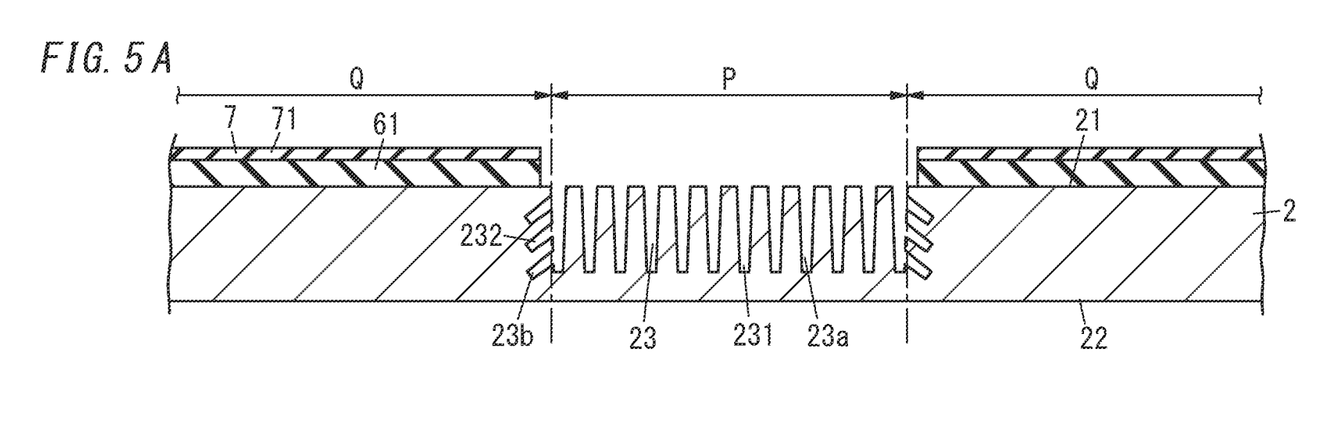
FIGS. 5A and 5B are schematic sectional views illustrating steps in the method of manufacturing the capacitor.

As shown in FIG. 5A, after the anode oxidation process, the electrode 8 is removed from the second surface 22 of the silicon substrate 2.

<Dielectric Layer Forming Step>

Figure 5B:
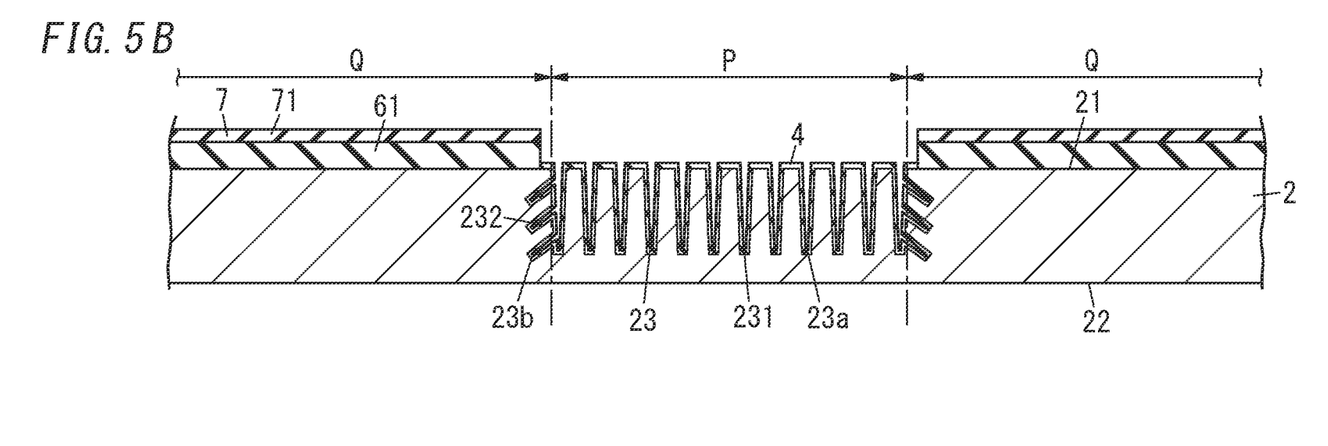

As shown in FIG. 5B, the dielectric layer forming step includes forming the dielectric layer 4 on an inner surface of the porous part 23. Specifically, the dielectric layer 4 is formed on inner surfaces of the first fine pores 23a of the first porous part 231 and inner surfaces of the second fine pores 23b of the second porous part 232. In the present embodiment, the dielectric layer 4 is further formed in the opening region P of the principal surface 21 of the silicon substrate 2.

The dielectric layer 4 can be formed by, for example, a thermal oxidation process. The thermal oxidation process can be performed by heating the silicon substrate 2 provided with the porous part 23 at a temperature of higher than or equal to 800° C. and lower than or equal to 1200° C. in an oxygen atmosphere. Thus, the dielectric layer 4 becomes a layer including silicon oxide. Note that the dielectric layer 4 may be formed by a chemical vapor deposition method.

<Conductive Portion Forming Step>

Figure 6A:
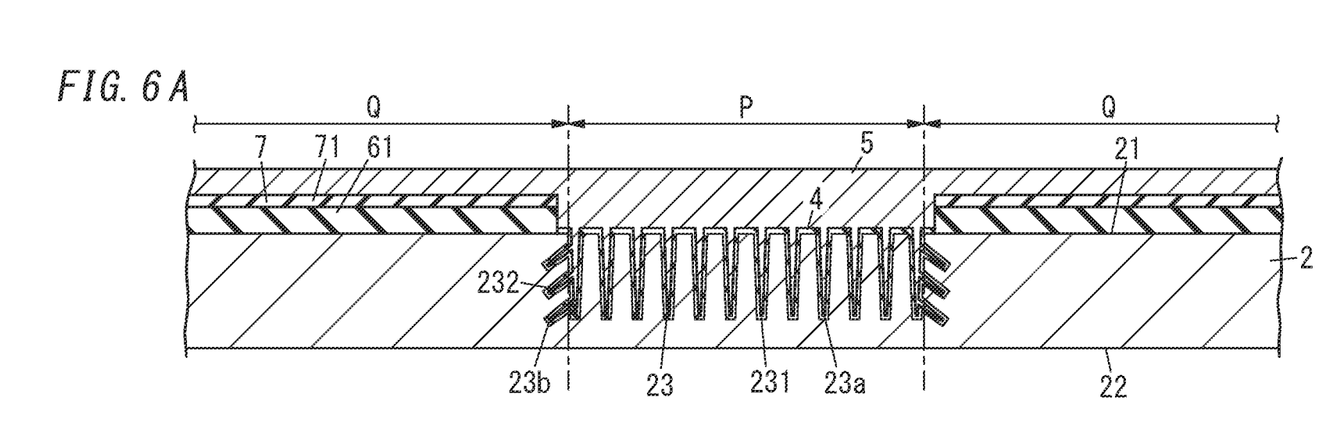
FIGS. 6A and 6B are schematic sectional views illustrating steps in the method of manufacturing the capacitor.

As shown in FIG. 6A, the conductive portion forming step includes forming the conductive portion 5 all over the surface at the side of the principal surface 21 of the silicon substrate 2. A surface (surface directed in the positive direction of the Z axis) of the conductive portion 5 is located in the positive direction of the Z axis with respect to a surface (surface directed in the positive direction of the Z axis) of the insulating layer 6 (masking layer 7).

The conductive portion 5 is formed in the opening region P and the non-opening region Q. In the opening region P, the conductive portion 5 is filled, on the dielectric layer 4, in the porous part 23. That is, the conductive portion 5 is filled, on the dielectric layer 4, in the first fine pores 23a of the first porous part 231 and the second fine pores 23b of the second porous part 232.

The conductive portion 5 can be formed by, for example, a chemical vapor deposition method. A material for the conductive portion 5 is not particularly limited, but examples of the material include polysilicon, platinum, and ruthenium.

Figure 6B:
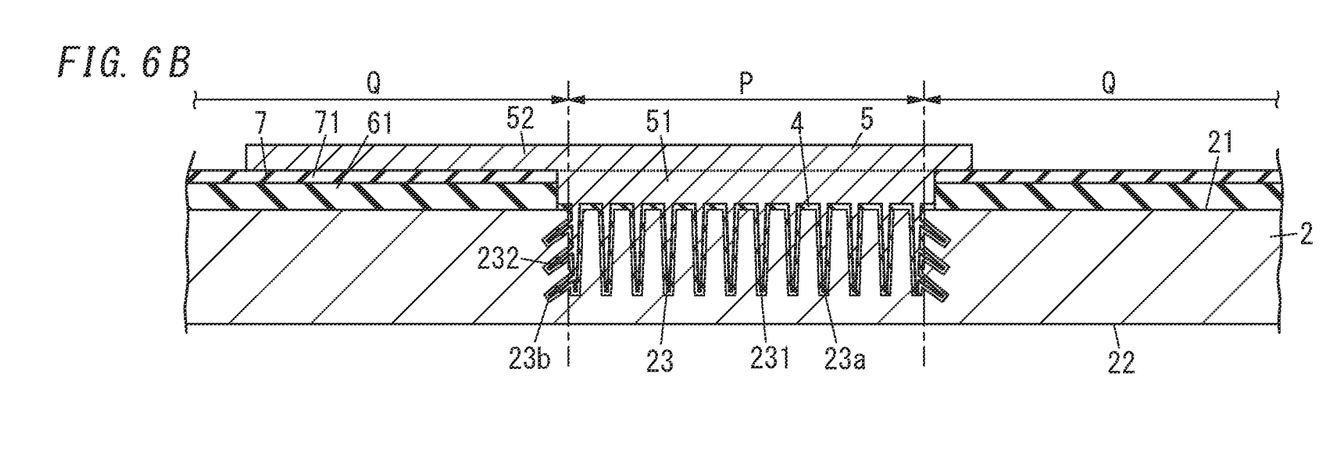

Next, as shown in FIG. 6B, part of the conductive portion 5 in the non-opening region Q is removed. The conductive portion 5 can be removed by, for example, semiconductor laser. Thus, the second conductive portion 52 is formed.

<Terminal Forming Step>

Figure 7A:
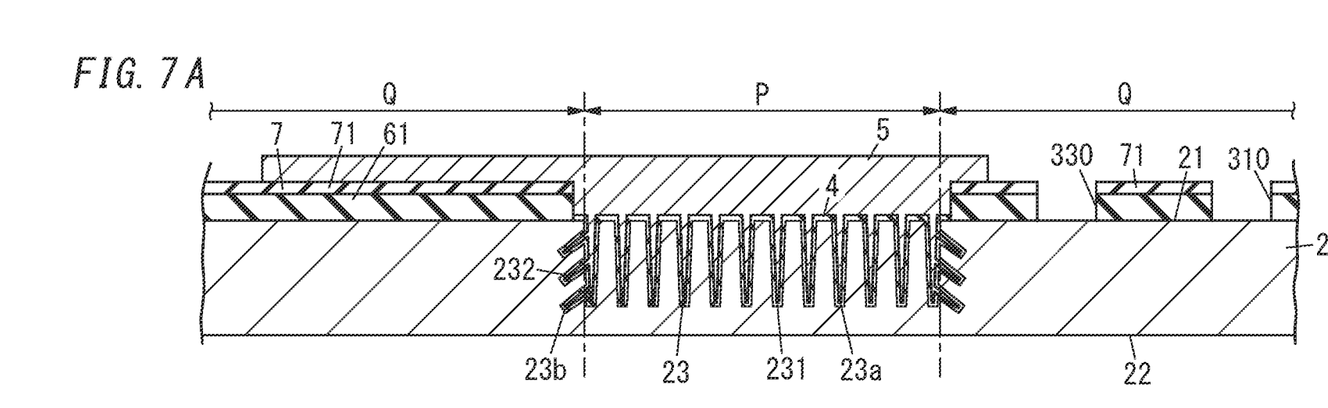
FIGS. 7A and 7B are schematic sectional views illustrating steps in the method of manufacturing the capacitor.

As shown in FIG. 7A, the terminal forming step includes first of all forming an opening section 310 and a groove section 330 penetrating through the insulating layer 6 (the first insulating layer 61 and the masking layer 7) in the non-opening region Q. Bottom surfaces of the opening section 310 and the groove section 330 are the first surface 21 of the silicon substrate 2. The opening section 310 and the groove section 330 can be formed by, for example, portion etching.

Figure 7B:
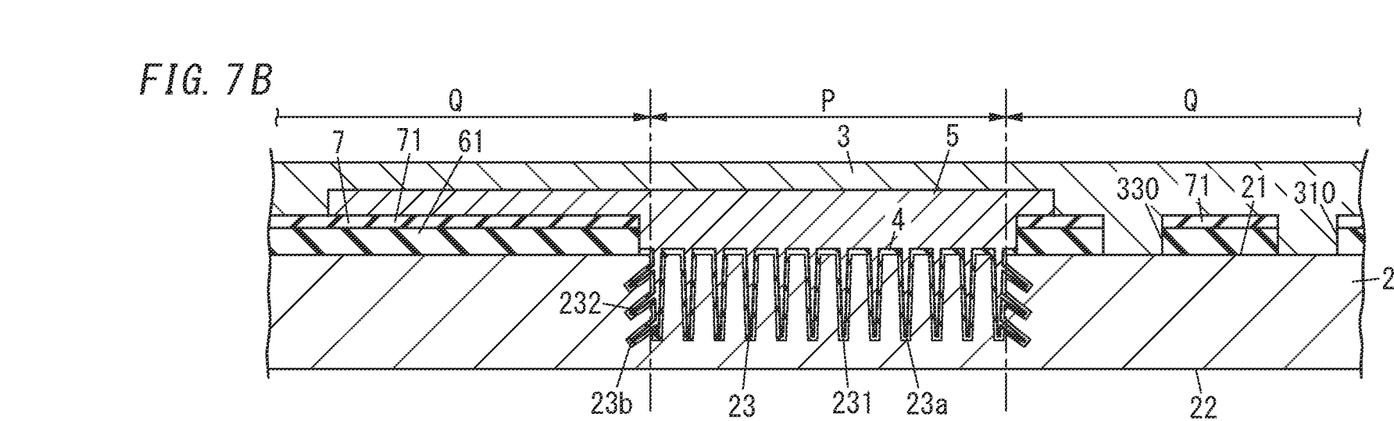

Then, as shown in FIG. 7B, a metal layer 3 is formed all over the surface at the side of the principal surface 21 of the silicon substrate 2. A surface (surface directed in the positive direction of the Z axis) of the metal layer 3 is located in the positive direction of the Z axis with respect to a surface (surface directed in the positive direction of the Z axis) of the conductive portion 5.

A material for the metal layer 3 is not particularly limited, but examples of the material include gold, silver, copper, platinum, ruthenium, titanium, and aluminum. Electrical resistivity of the metal layer 3 made of these materials is lower than the electrical resistivity of the silicon substrate 2.

The metal layer 3 is formed in the opening region P and the non-opening region Q. In the non-opening region Q, the metal layer 3 is filled in the opening section 310 and the groove section 330. Thus, the metal layer 3 comes into contact with the first surface 21 of the silicon substrate 2. The metal layer 3 can be formed by, for example, a chemical vapor deposition method.

Thereafter, as shown in FIG. 8, of the metal layer 3, portions in contact with the silicon substrate 2 through the opening section 310 and the groove section 330 and a portion in contact with the conductive portion 5 (second conductive portion 52) are left while the other portions of the metal layer 3 are removed. The metal layer 3 can be removed by, for example, semiconductor laser. The portions in contact with the silicon substrate 2 through the opening section 310 will serve as the first terminals 31. The portions in contact with the conductive portion 5 will serve as the second terminals 32. The portions in contact with the silicon substrate 2 through the groove section 330 will serve as a wire 33 (described later).

Through the steps explained above, the capacitor 1 according to the present embodiment is manufactured.

(2) Second Embodiment

Next, a capacitor 1 according to a second embodiment will be described with reference to the drawings. In the second embodiment, components similar to those in the first embodiment are denoted by the same reference signs as those in the first embodiment, and the detailed description thereof may be omitted.

The capacitor 1 according to the present embodiment has increased electrostatic capacitance per substrate unit area in a similar manner to the capacitor 1 according to the first embodiment.

In particular, the capacitor 1 according to the present embodiment in different from the capacitor 1 according to the first embodiment in the positional relationship of first terminals 31 to second terminals 32.

<Positional Relationship between First Terminal and Second Terminal>

Figure 10:
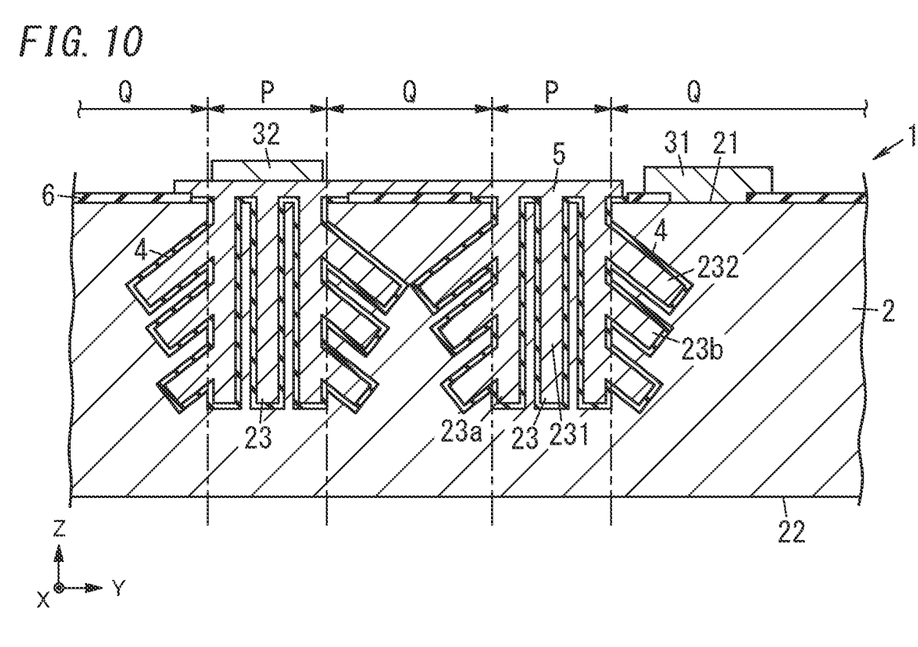
FIG. 10 is a schematic sectional view of a capacitor according to a second embodiment.

As shown in FIG. 10, in the capacitor 1 according to the present embodiment, each first terminal 31 is in a non-opening region Q, and each second terminal 32 is in an opening region P. Thus, in the present embodiment, instead of that both the first terminals 31 and the second terminals 32 are in the opening region P, the first terminals 31 are in the non-opening region Q. Thus, as compared with the case where both the first terminals 31 and the second terminals 32 are in the opening region P, the silicon substrate 2 is less likely to be damaged.

(3) Third Embodiment

Next, a capacitor 1 according to a third embodiment will be described below with reference to the drawings. In the third embodiment, components similar to those in the first and the second embodiments are denoted by the same reference signs as those in the first and second embodiments, and the detailed description will sometimes be omitted.

Figure 11:
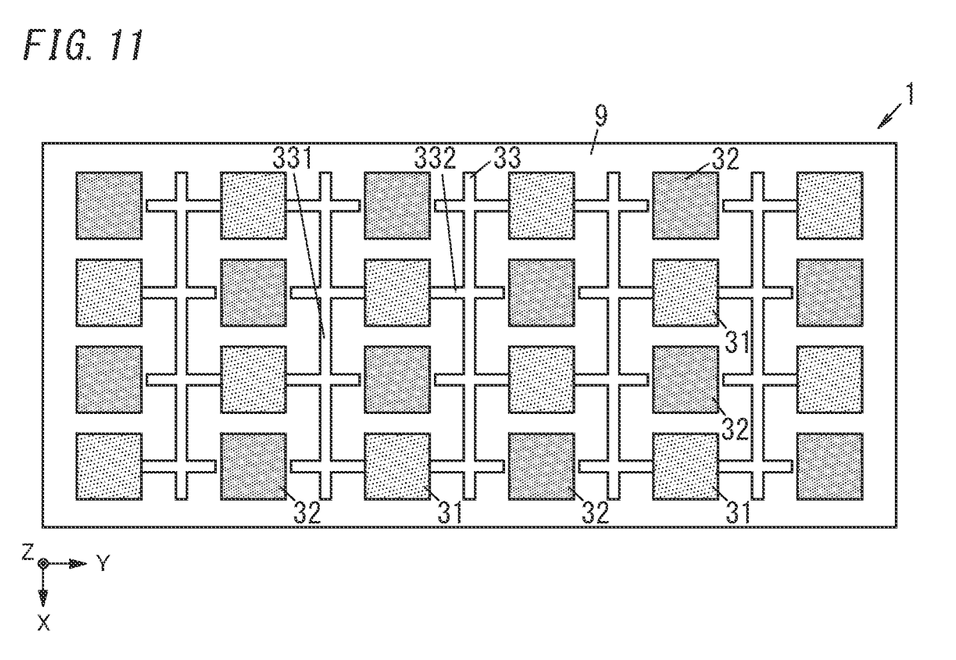
FIG. 11 is a schematic plan view of a capacitor according to a third embodiment.

In particular, the capacitor 1 of the present embodiment is different from the capacitor 1 of each of the first and second embodiments in that a wire 33 electrically connecting the plurality of first terminals 31 to each other is provided as shown in FIG. 11.

<Wire>

As described above, the wire 33 electrically connects the plurality of first terminals 31 to each other. On the other hand, the wire 33 is electrically insulated from second terminals 32.

The wire 33 includes at least one or more (in the present embodiment, a plurality of) first wires 331 and at least one or more (in the present embodiment, a plurality of) second wires 332.

Each first wire 331 is a wire extending in the X-axis direction. The plurality of first wires 331 are aligned in the Y-axis direction. The first terminals 31 or the second terminals 32 are between adjacent first wires 331.

Each second wire 332 is a wire extending in the Y-axis direction. That is, each second wire 332 is orthogonal to the first wires 331. The plurality of second wires 332 are aligned in the X-axis direction. Each second wire 332 is electrically connected to a corresponding one of the first terminals 31.

The wire 33 is electrically connected to a silicon substrate 2 (e.g., see FIG. 8). Specifically, the wire 33 is in contact with a principal surface 21 of the silicon substrate 2.

The electrical resistivity of the wire 33 is lower than the electrical resistivity of the silicon substrate 2. A material for the wire 33 is not particularly limited, but examples of the material include gold, silver, copper, platinum, ruthenium, titanium, and aluminum. The electrical resistivity of the wire 33 formed from these materials is lower than the electrical resistivity of the silicon substrate 2.

The wire 33 is formed from the same material as that for the first terminals 31 and the second terminals 32 at the same time as the first terminals 31 and the second terminals 32 in the terminal forming step described above (see FIGS. 7A, 7B, and 8). Note that in FIG. 11, the wire 33 is shown, but the wire 33 may be covered with another electrically insulating resist layer.

<Effects>

The capacitor 1 according to the present embodiment also has increased electrostatic capacitance per substrate unit area in a similar manner to the capacitor 1 according to the first embodiment.

Moreover, in the present embodiment, the wire 33 electrically connects the plurality of first terminals 31 to each other, and therefore, the plurality of first terminals 31 are at the same potential. Thus, when the capacitor 1 includes a plurality of porous parts 23, thereby reducing temporal variations in charging (storing electricity) at a portion of each porous part 23.

Further, in the present embodiment, the wire 33 whose electrical resistivity is lower than that of the silicon substrate 2 is electrically connected to the silicon substrate 2, and therefore, the plurality of first terminals 31 are easily at the same potential. Thus, when the capacitor 1 includes a plurality of porous parts 23, temporal variations in charging (storing electricity) at the portion of each porous part 23 is further reduced.

REFERENCE SIGNS LIST

1 Capacitor
2 Silicon Substrate
21 Principal Surface (First Surface)
23 Porous Part
31 First Terminal
32 Second Terminal
33 Wire
4 Dielectric Layer
5 Conductive Portion
P Opening Region
Q Non-Opening Region

The invention claimed is:

1. A capacitor comprising:
   a silicon substrate having:
      a principal surface including an opening region and a non-opening region other than the opening region, and
      a porous part having an opening in the opening region;
   at least one first terminal electrically connected to the silicon substrate;
   a dielectric layer on an inner surface of the porous part;
   a conductive portion filled, on the dielectric layer, in the porous part; and
   at least one second terminal electrically connected to the conductive portion,
   at least one of the at least one first terminal or the at least one second terminal overlapping at least part of the porous part in a normal direction of the principal surface,
   the at least one first terminal including a plurality of first terminals,
   the at least one second terminal including a plurality of second terminals,
   the capacitor further comprising a wire electrically connecting the plurality of first terminals to each other, and
   the wire having electrical resistivity lower than electrical resistivity of the silicon substrate.

2. The capacitor of claim 1, wherein
   the at least one first terminal and the at least one second terminal are in the non-opening region.

3. The capacitor of claim 1, wherein
   the at least one first terminal is in the non-opening region, and
   the at least one second terminal is in the opening region.

4. The capacitor of claim 1, wherein
   the plurality of first terminals and the plurality of second terminals are arranged in a lattice pattern when viewed in the normal direction of the principal surface.

5. The capacitor of claim 4, wherein
   the plurality of first terminals and the plurality of second terminals are alternately aligned when viewed in the normal direction of the principal surface.

6. The capacitor of claim 1, wherein
   the wire is electrically connected to the silicon substrate.

\* \* \* \* \*